Oct. 25, 1955
J. A. MacDONNELL
2,721,572
OVER-INFLATION SIGNALLING DEVICE
Filed Sept. 25, 1952
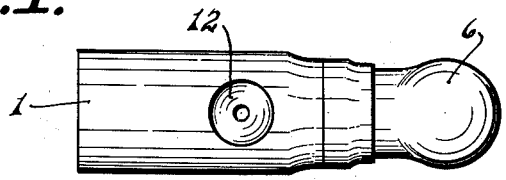
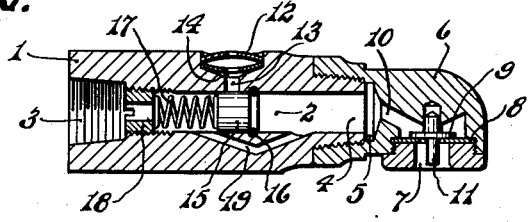
INVENTOR
JAMES ALAN MacDONNELL
BY *Chapin & Neal*
ATTORNEYS

United States Patent Office 2,721,572
Patented Oct. 25, 1955

2,721,572
OVER-INFLATION SIGNALLING DEVICE

James Alan MacDonnell, Longmeadow, Mass., assignor to Gilbert & Barker Manufacturing Company, West Springfield, Mass., a corporation of Massachusetts Application September 25, 1952, Serial No. 311,373

1 Claim. (Cl. 137—102)

This invention relates to a device for indicating over-inflation of an inflatable article, such for example, as a pneumatic tire, and for correcting the condition.

Service stations for automotive vehicles commonly provide tire inflation apparatus, which can be manually set to any pressure to which it is desired to inflate the tire. Inflation takes place in pulses until the tire is inflated to the selected pressure, when the air supply is automatically shut-off. As inflation proceeds, signals are intermittently given, one for each pulse, although the operator holding the hose can also feel the pulsations. Apparatus of this character, however, makes no provision for the condition, where the tire is already over inflated at the time when the inflation hose is applied to it. While no more air will be admitted to the tire in such a case and the operator knows from the lack of pulsations in the hose or the lack of accompanying signals that no more air is needed, he does not know that the tire is already under excessive pressure. When a tire, which has been inflated to the proper pressure when cold, is driven, it becomes heated, causing an increase in pressure because the inner tube is held against expansion by the tire. This increase is a normal one, requiring no relief of pressure because the pressure will drop to normal again when the tire cools. However, any pressure in excess of this normal increase is considered over-inflation, requiring correction, and the operator should be apprised of the fact and correct the condition.

This invention has for an object the provision of a device which will warn the operator when over-inflation exists and which will enable him easily to correct the condition.

More particularly, the invention has for an object the provision of an air-actuable signal and control means therefor, incorporated in a casing that can be interposed in the hose of tire inflation apparatus and, conveniently, by connecting it to the chuck at the delivery end of the hose, for actuating the signal by air introduced into the casing from the tire, when the pressure of such air exceeds to a predetermined extent the pressure for which the apparatus is set.

The invention will be disclosed with reference to the one illustrative embodiment of it shown in the accompanying drawings, in which, Fig. 1 is a top plan view of a device embodying the the invention and shown as attached to a tire chuck; and Fig. 2 is a sectional elevational view thereof taken on the line 2—2 of Fig. 1.

Referring to these drawings, the signalling device is incorporated in a casing 1, which may be of any suitable form and has a main passage 2 extending longitudinally therethrough. The inlet end 3 of this passage is interiorly screw-threaded for attachment to the usual coupling at the discharge end of the inflation hose of an inflating apparatus. At the outlet end 4 of this passage, the casing 1 is exteriorly screw-threaded for attachment to the interiorly-threaded inlet end 5 of a tire chuck 6. While the casing 1 is herein shown attached to the chuck as it would be used in the field, the chuck forms no part of the present invention, the casing 1 and attached parts constituting the signalling device as a separate article complete in itself.

The chuck 6 is a standard article of usual and well known form. It includes an outlet passage 7, adapted to telescope the upper end of the valve stem on the inner tube of a tire; a rubber washer 8 for closely engaging the outer end face of the valve stem; a chamber 10 interposed between the inlet 5 and outlet 7; a valve 9 normally held by air pressure against the inner flat face of the washer 8 to prevent escape of air from the chamber 10 to the outlet 7; and a stem 11, fixed to the outer face of valve 9 and adapted to engage and open the valve in the stem when the latter is engaged in the outlet 7 and also lift valve 9 away from washer 8.

The casing 1 has fixed thereto a suitable air-actuated signal, which conveniently may take the form of a whistle 12. This whistle is actuated by air which, when a certain condition exists, escapes from the main passage 2 through a branch passage 13. This branch passage extends from main passage 2 to the exterior of the casing 1 and the whistle 12 is interposed in the branch passage and conveniently at the outer end thereof. The whistle may be secured to the casing 1 by pressing it tightly into a recess 14, in which it is held by frictional engagement, or in any other suitable way.

Slidably mounted in the main passage 2 is a piston 15 which also serves as a valve to control communication between the main and branch passages 2 and 13, respectively. This piston has opposite end faces of substantially equal area acted on in opposite directions by fluid pressure. A suitable stop 16, which may be a rubber O-ring inserted in a circumferential groove in passage 2, is provided to limit the movement of the piston in one direction. A coil spring 17, acting between the inner end face of a bushing 18, which is screw threaded, or otherwise suitably fixed in passage 2, and one end face of piston 15, yieldingly holds the latter engaged with stop 16. This spring acts on the piston with a pressure which is substantially commensurate with the allowable normal increase in pressure of the tire due to the heat of normal driving. The piston, when engaged with this stop, closes off the branch passage 13 and prevents escape of air therethrough from passage 2. The casing 1 is also provided with passage 19, which serves as a by-pass around piston 15, when the latter is positioned against stop 16, enabling flow of air from the tire inflation apparatus to the tube of the tire, the air flowing through inlet 3, the hole in bushing 18, the passage 19, and outlet 4 into the chuck 6 and thence into the stem and tube of the tire.

In operation, assuming that the inlet 3 is fixed to the outlet end of the hose of a tire inflation apparatus, which has been set to limit the maximum pressure that can exist in the hose to the desired predetermined value, the chuck 6 is applied to the valve stem of the tube of a tire, causing the valve in such stem to be opened as well as the valve 9 in the chuck and thereby establishing communication between the interior of the tire tube and the outlet end of passage 2. If the pressure in the tire tube is less than the predetermined pressure for which the apparatus is set, inflation takes place in the usual manner, the air traveling freely through the casing 1 to chuck 6 by way of the by-pass 19 around the piston 15.

If, however, the pressure in the tire tube should be greater than that for which the apparatus is set plus the pressure of spring 17, the piston 15 will be moved away from its stop 16, uncovering the inlet end of branch passage 13 and allowing air to escape through the latter and the whistle, thus providing an audible signal to apprise the operator of the over-inflated condition of the tire. If the chuck 6 is left attached to the tire valve stem the pressure in the tire will be relieved by the escape of air through passage 13 and, when the pressure is sufficiently relieved, the piston 15 will be moved back to close off passage 13.

It is desirable to close off communication between the inlet 3 and the outlet 4, whenever piston 15 opens passage 13, thus preventing air from the tire entering the hose and enabling quicker correction of the abnormal pressure condition.

As an example, and without intending to impose any limitations, suppose that the proper pressure for a particular tire, when cold, is 24 p. s. i., and that an increase of 5 p. s. i., due to heat is allowable. The inflation apparatus is set for 24 p. s. i., and the spring 17 will supply the 5 p. s. i., making a total of 29 p. s. i., acting to hold piston 15 against its stop 16. Now, if the tire pressure is 30 p. s. i., then, when chuck 6 is applied to the valve stem of the tire, the piston 15 will be moved to the left, uncovering passage 13, causing air to flow through the whistle and reduce the pressure in the tire until it is slightly below 29 p. s. i. when piston 15 will be moved back to close off the passage 13. If in the given example, the pressure in the tire was 29 p. s. i., the piston would remain against stop 16 and the whistle would not be sounded. Also the operator would not feel any pulsations in the hose or hear any inflation signals because the inflation apparatus is shut off at 24 p. s. i. Accordingly, the operator will know that the tire pressure is correct, within whatever limit is chosen as allowable for pressure increase due to heat.

The invention thus affords a device which is a useful adjunct to tire inflation apparatus to help an operator detect over-inflation and correct the same.

What is claimed is:

An over-inflation relief device, comprising, a casing having a first passage extending therethrough with an inlet adapted for connection to a source of fluid under a predetermined pressure and an outlet adapted for connection to an inflatable article, a valve normally closing said outlet and adapted to be opened when said outlet is connected to such an article, said first passage including intermediate its ends a cylindrical portion, a piston slidable in said portion and partitioning said inlet from said outlet, a stop in said portion for limiting the movement of the piston in a direction toward said outlet, a spring in said portion tending to hold the piston engaged with said stop, said casing having a second passage connecting its exterior to said cylindrical portion with an opening into the latter so located as to be covered by said piston when engaged with said stop, said casing having a third passage communicating at opposite ends with said cylindrical portion and being continuously open between said ends, one said end being located beyond said stop in the direction of the outlet and the other end being located beyond said piston in the direction of the inlet so as to be uncovered when the piston is engaged with said stop and covered when the piston is moved away from said stop far enough to uncover the opening of the second passage, said piston being movable away from said stop, when the pressure at the outlet exceeds the pressure at the inlet plus that of said spring, to uncover the opening of the second passage and cover the opening of the third passage.

References Cited in the file of this patent
UNITED STATES PATENTS

| | | |
|---|---|---|
| 290,429 | Hodges | Dec. 18, 1883 |
| 429,591 | Abbe | June 10, 1890 |
| 1,176,703 | Durham | Mar. 21, 1916 |
| 1,230,981 | Bacon | June 26, 1917 |
| 1,405,706 | Bentley | Feb. 7, 1922 |
| 1,794,672 | Cox | Mar. 3, 1931 |
| 1,985,759 | Baumgartner | Dec. 25, 1934 |